(12) United States Patent
Graham et al.

(10) Patent No.: US 6,246,718 B1
(45) Date of Patent: Jun. 12, 2001

(54) METHOD AND APPARATUS FOR DECODING A BIT SEQUENCE FOR TRANSMISSION OVER POTS WIRING

(75) Inventors: Martin H. Graham, Berkely; Harold H. Webber, Jr., Lafayette, both of CA (US)

(73) Assignee: Tut Systems, Inc., Pleasanton, CA (US)

( * ) Notice: Subject to any disclaimer, the term of this patent is extended or adjusted under 35 U.S.C. 154(b) by 0 days.

(21) Appl. No.: 09/199,113

(22) Filed: Nov. 24, 1998

Related U.S. Application Data (62) Division of application No. 08/925,205, filed on Sep. 8, 1997, now Pat. No. 5,963,595.

(51) Int. Cl.$^7$ ............................................... H03K 7/08
(52) U.S. Cl. ........................ 375/238; 375/316; 375/286
(58) Field of Search ................................. 375/238, 239, 375/286, 268, 316, 320; 340/870.19, 870.21, 870.24

(56) References Cited

U.S. PATENT DOCUMENTS

| | | | | |
|---|---|---|---|---|
| 5,790,495 | * | 8/1998 | Kimura et al. | 369/59 |
| 5,856,980 | * | 1/1999 | Doyle | 371/5.1 |
| 5,930,303 | * | 7/1999 | Walker | 375/301 |
| 6,064,697 | * | 5/2000 | Yoshikawa | 375/242 |

* cited by examiner

Primary Examiner—Chi Pham
Assistant Examiner—Emmanuel Bayard
(74) Attorney, Agent, or Firm—Blakely, Sokoloff, Taylor & Zafman (57) ABSTRACT

A method and apparatus for decoding a symbol, having a time duration indicative of a bit sequence and determined by first and second delimiters being with the detection of the first delimiter of the symbol on a carrier medium. A predetermined blanking interval is measured following detection of this first delimiter. Detection of the second delimiter on the carrier medium is prevented prior to expiration of the predetermined blanking interval. This is to prevent the detection of reflections resulting from the propagation of the first delimiter over the carrier medium, and the incorrect identification of such reflections as the second delimiter of the symbol. The valid second delimiter of the symbol is then detected on a carrier medium subsequent to expiration of the predetermined blanking interval. A symbol, indicative of the bit sequence, is identified from a group of symbols based on the time duration between the respective detections of the first and second delimiters.

38 Claims, 10 Drawing Sheets

METHOD AND APPARATUS FOR DECODING A BIT SEQUENCE FOR TRANSMISSION OVER POTS WIRING

This is a division of U.S. application Serial No. 08/925,205, filed Sep. 8, 1997, now U.S. Pat. No. 5,963,595.

FIELD OF THE INVENTION

The present invention relates generally to the field of decoding digital data for transmission over a medium. More specifically, the present invention relates to the decoding of a bit sequence transmittal over Plain Old Telephone Service (POTS) wiring.

BACKGROUND

Local Area Network (LAN) standards and products have not significantly penetrated the home computing market for a number of reasons, including the lack of perceived need and the required installation of special cabling, which is difficult within a residential household. As multiple personal computers (PCs) are becoming increasingly common within households, the notion of implementing a LAN within a residential environment is gaining in popularity. Specifically, the ability to share information between multiple PCs, and to share resources such as printers and modems, is becoming increasingly attractive to home computer users. In particular, the ability to achieve shared, high-speed Internet access by a number of computers within a household is becoming important as multiple users within a residence may wish simultaneously to access the Internet.

One economical method of creating a LAN within a residential household proposes using the existing telephone wiring within the residence (POTS wiring) as the medium over which the LAN is implemented. Such wiring typically comprises unshielded, twisted-pair (UTP) telephone cable and may comprise either Category 1 or Category 2 cable, as defined by the EIA/TIA 568 specification. The use of such residential telephone wiring poses a number of problems in that the transmission of data signals must occur over an arbitrary, unterminated wiring system, with unknown electrical characteristics. This results in impedance mismatches. The lack of termination also contributes to the persistent reflection of signals and unpredictable peaks and valleys in frequency response within a band of interest. The power splitting effect of star configurations, which are commonly found in residential wiring, attenuate the levels of signal features whose duration is short compared to the propagation delay of the wire branches.

A LAN implemented over residential telephone wiring may also be required to coexist with the POTS service, and to be FCC part 68 compliant, which dictates the use of signals with no frequency components below 270 kHz and transport levels below 178 mV.

SUMMARY OF THE INVENTION

According to the invention, there is provided a method of decoding a symbol having a time duration indicative of a bit sequence, the time duration be determined by first and second delimiters. The decoding method commences when the first delimiter is detected, whereafter a timer is initiated. Detection of the second delimiter is prevented for a predetermined blanking interval so as to prevent detection of reflections resulting from the propagation of the first delimiter over the carrier medium. The second delimiter is then detected after expiration of the blanking interval. In one embodiment, at least one bit of the bit sequence may be decoded utilizing the polarity of the second delimiter.

The invention extends to a decoder that implements the above methodology.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for decoding a bit sequence for transmission of POTS wiring are described. In the following description, for the purposes of explanation, numerous specific details are set forth in order to provide a thorough understanding of the present invention. It will be evident, however, to one skilled in the art that the present invention may be practiced without these specific details.

Apparatus—Overview

Figure 1A:
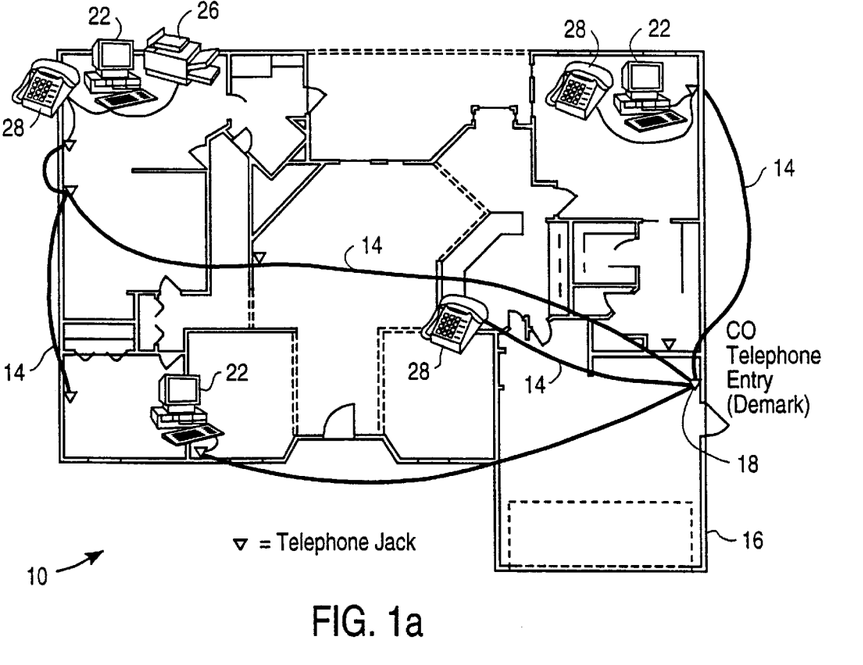
FIGS. 1a and 1b illustrate Local Area Networks (LANs) implemented using arbitrary topology TOPS wiring.
Figure 1B:
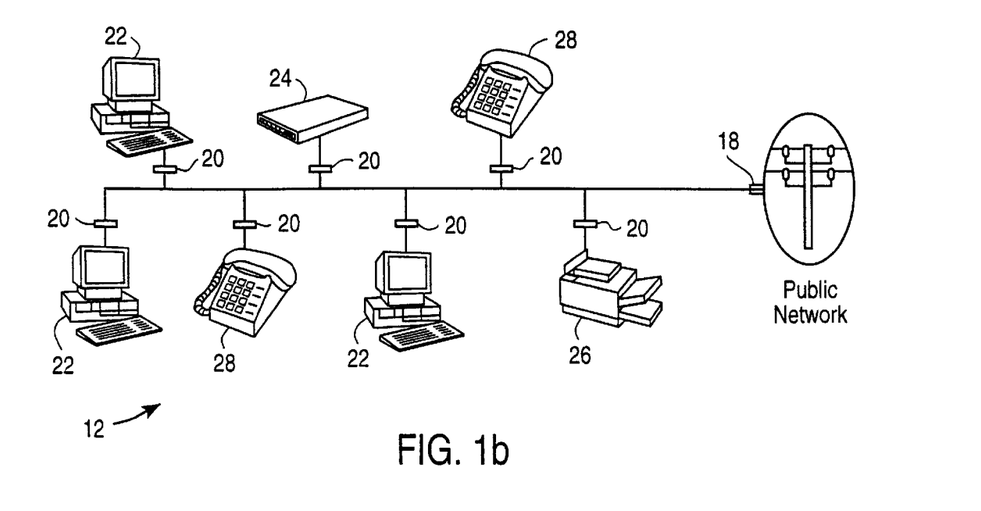

FIGS. 1a and 1b each illustrate a respective Local Area Network (LAN) 10 and 12 which may be implemented utilizing arbitrary topology POTS wiring 14, such as UTP wiring, within a residential building 16. The wiring 14 fans out from a central connection point 18, through which the wiring 14 connected to a central office, to numerous phone jacks 20 located throughout the building 16. A number of LAN devices (also termed "stations" or "nodes"), such as computers 22, modems 24 or printers 26, may be coupled to the wiring 14 via the jacks 20. Regular telephones 28 are also shown to be coupled to the wiring 14 via respective jacks 20. A number of branches of the wiring 14 may furthermore terminate in a jack 20 into which a LAN device or telephone is not connected, and are accordingly unterminated. As will be appreciated from FIG. 1a, the wiring 14 interconnecting the LAN devices has an irregular topology, and includes a number of unterminated branches. Impedance mismatches, the arbitrary topology, and the lack of termination within the LANs 10 and 12 result in the reflection of signals and unpredictable frequency responses within these LANs 10 and 12. Further, the star configuration illustrated in FIG. 1a serves to attenuate the levels of signal features whose duration is short compared to the propagation delay of the wire branches.

Figure 2:
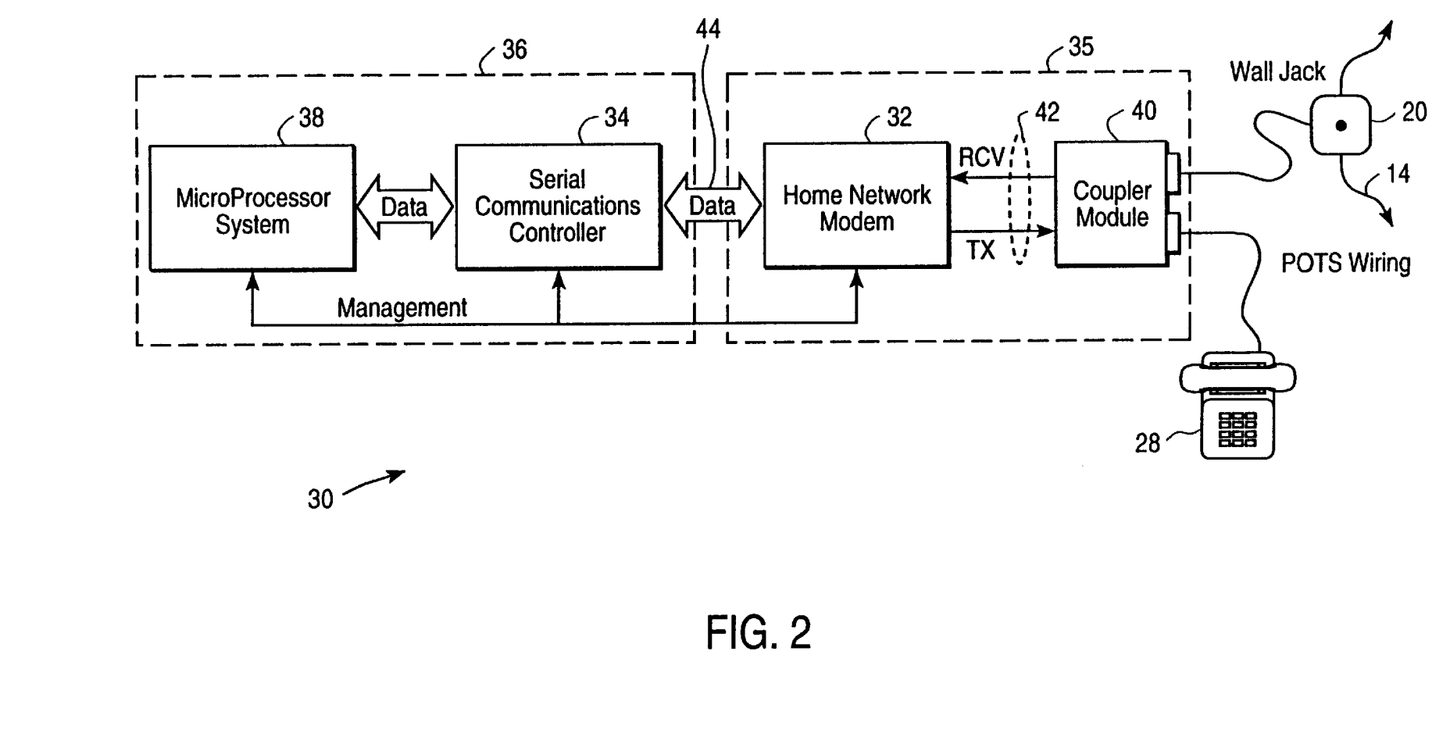
FIG. 2 is a diagrammatic representation of a network station according to one embodiment of the present invention.

Turning now to FIG. 2, there is illustrated a network station 30 coupled to a LAN via uncharacterized, arbitrary topology wiring, such as the POTS wiring 14 illustrated in FIGS. 1a and b. The network station 30 allows a number of well-known protocol and LAN features to be implemented within the LANs 10 and 12. For example, the LAN 12 may use Ethernet, BISYNC or HDLC framing, and implement Collision Detecting, Collision Avoiding, TDMA, Polled or Token Passing access methods.

An overview of the various components of the network station 30 will now be provided. The station 30 comprises a network device 36 and an adapter 35. The adapter 35 includes a modem 32 that serves to adapt a communications controller 34 (such as an ethernet communications controller) of the network device 36 (such as a computer) for communication over the arbitrary POTS wiring 14. In one embodiment, the modem 32 provides medium interface, signal encoding and decoding (ENDEC), clock recovery and collision detection functions. Exemplary embodiments of collision detection circuitry and functions that may be implemented within the adapter 35 are described in co-pending application Ser. No. 09/925,043, entitled "METHOD AND APPARATUS FOR DETECTING COLLISIONS ON A NETWORK", filed Sep. 8, 1997 and assigned to the assignee of this application. To accommodate a variable bit rate encoding/decoding scheme, and to control the flow the data between the network device 36 and the wiring 14, the modem 32 controls the clocking of data to and from the communications controller 34. The modem 32 may further support Carrier Sense Multiple Access/Collision Detection (CSMA/CD) based Media Access Control (MAC) layers and accordingly provides carrier detect and collision indication signals. The modem 32 is furthermore shown to be coupled to a microprocessor system 38 of the network device 36 via a management interface, which allows the modem 32 to be controlled by software executing within the microprocessor system 38. The adapter 35 further incorporates a coupler module 40 by which the network station 30 is coupled to the jack 20 and POTS wiring 14. The coupler module 40 includes a pair of RJ-11 ports through which the wall jack 20 and the telephone 28 are coupled to the network device 36. The coupler module 40 is furthermore connected to the modem 32 via a transmit/receive connection 42.

A filter (not shown) is incorporated within the coupler module 40, and acts as a bandpass with a lower cutoff frequency of around 400 kHz and upper cutoff frequency around 4 MHz. The filter is AC coupled to the wiring 14 to prevent interference with POTS operations. Further details of the coupler module 40 are not pertinent to an understanding of the present invention.

Referring now to the network device 36, the communications controller 34 is typically responsible for Link-Layer protocol functions, such as framing, error detection, address recognition and media access. In one embodiment, the controller 34 is an Ethernet LAN serial controller, and in an alternative embodiment is a High-Level Data Link Control (HDLC) serial controller. The microprocessor system 38 is responsible for the execution of software which controls the controller 34 and the modem 32. The microprocessor system 38 is furthermore shown to be coupled to the controller 34 via a data bus 44, and the controller 34 is similarly coupled to the modem 32.

The adapter 35 thus allows a network device 36, including a communications controller 34, such as an Ethernet controller, to be coupled to a LAN implemented using POTS wiring 14, and serves to encode data transmitted from the network device 36 onto the LAN into a format suitable for propagation over the wiring 14. Similarly, the adapter 35 decodes signals received via the POTS wiring 14 into a format suitable for reception by the controller 34. While the adapter 35 is shown in FIG. 2 to reside outside the network device 36, it will be appreciated that the adapter 35 could in fact be incorporated within the network device as, for example, part of a Network Interface Card (NIC). Alternatively, the adapter 35 may comprise a stand-alone unit which is coupled between a serial port of the network device 36 and the wall jack 20.

Figure 3:
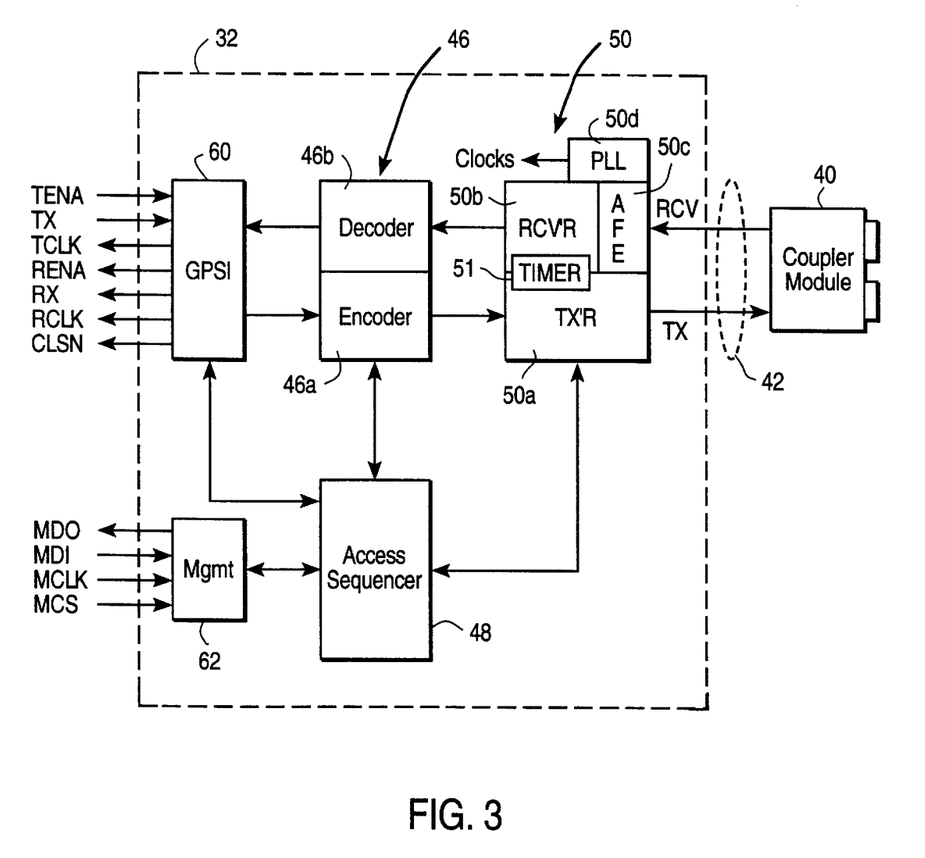
FIG. 3 is a diagrammatic representation of a modem, according to one embodiment of the present invention, included within the network station shown in FIG. 2.

FIG. 3 is a block diagram providing a more detailed view of the components of the modem 32. Specifically, the modem 32 comprises an encoder/decoder (ENDEC) 46 which is responsible for encoding a bit sequence as a symbol for transmission over a carrier medium such as the POTS wiring 14. Similarly, the ENDEC 46 is responsible for decoding a symbol received from the wiring 14 to generate a bit sequence. The encoding and decoding operations performed by the ENDEC 46 will be described in further detail below. The ENDEC 46 furthermore supplies both transmit and receive clocks to the communications controller 34, and overall operation of the ENDEC 46 is under the control of an access sequencer 48. The access sequencer 48 selects a general mode of operation for the ENDEC 46 and for the modem 32 as a whole.

The modem 32 further includes receiver/transmitter circuitry 50, which is responsible for the reception and transmission of symbols encoding bit sequences. In one embodiment of the invention, such symbols are delimited by electrical pulses, in which case a transmitter 50a receives symbol and polarity information, synchronized to a master clock, from the ENDEC 46. In one embodiment, the symbol information received from the ENDEC 46 represents the variable-duration (or encoding) portion of an electrical composite symbol to be propagated from the transmitter 50a. The transmitter 50a appends a fixed-duration (or buffer) portion to the variable-duration portion to generate a composite symbol. The transmitter 50a then generates symbol delimiters, which determine the time duration and polarity of the composite symbol, in the form of pulse doublets. Each pulse doublet comprises first and second portions of approximately equal duration and opposite polarity, and has a fixed pulse width. The polarity of each pulse doublet is determined by information received from the ENDEC 46. As each pulse doublet comprises two equal portions of equal duration and opposite polarity, no Direct Current (DC) component is generated on the wiring 14 when the pulse doublet is transmitted thereon. Compliance with FCC Part 68 requires that the voltage levels of each pulse doublet be substantially less than would be generated when driving the coupler module 40 at Transistor-Transistor Logic (TTL) levels. A reduction in the voltage levels of each pulse may be accomplished by incorporating a series of resistors, or step-down windings, in a coupling transformer within the circuitry 50. In one embodiment, each pulse doublet comprises a single cycle of a 2 MHz sine wave.

Figure 7:
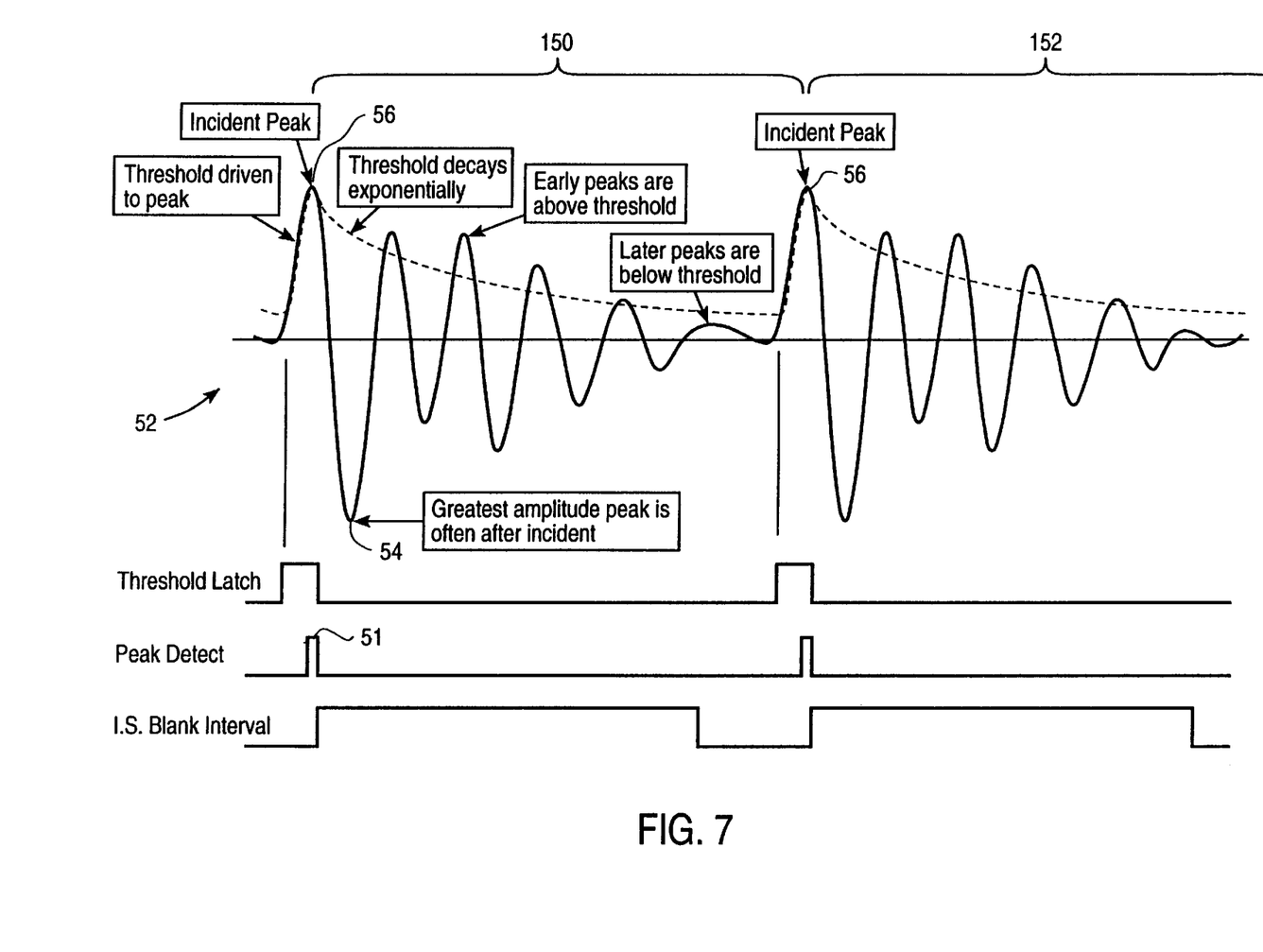
FIG. 7 illustrates a waveform generated on POTS wiring by the application of a pulse thereto.

The circuitry 50 also includes a receiver 50b, which comprises gain elements, comparator and digital control circuitry. The receiver 50b produces an output pulse, shown at 51 in FIG. 7, coincident with the first peak (i.e., the inflection point) of a complex waveform received by the wall jack 20 off the wiring 14. FIG. 7 provides an illustrative example of a waveform 52 that may be received at the receiver 50*b* off the wiring 14. The waveform 52 may be highly attenuated and distorted as a result of being propagated through a residential POTS wiring 14. As shown at point 54, reflections can result in a peak amplitude occurring sometime after arrival of the incident energy. Without line terminations and with complex topologies, pulse energy can continue for many microseconds, decaying gradually.

As mentioned above, the present invention proposes encoding a bit sequence as a symbol, the symbol having a time duration indicative of the bit sequence and being determined by first and second delimiters. In one embodiment of the invention, these delimiters comprise electrical pulses transmitted from a transmitter 50*a*. Thus, in order to successfully receive a symbol at the receiver 50*b*, the original pulses generated from a transmitter 50*a* must be as accurately reproduced as possible. To this end, the receiver 50*b* is required to detect the first peak of any incident waveform, as the precise time of arrival of these incident peaks must be determined to ascertain the time duration of a symbol. Accordingly, the receiver 50*b* is configured to detect the first incident peak, such as the peak 56, of the incident waveform 52, and to ignore potentially high amplitude pulses occurring soon after such an incident peak. The circuitry 50 is also shown to include an interpulse timer 51 that may be utilized for both the transmission and reception of symbols. Further details regarding the functioning of the circuitry 50, and the timer 51, are provide below.

Turning again to FIG. 3, the modem 32 also includes system interfaces in the form of a General Purpose Serial Interface (GPSI) 60 and a management interface 62. The GPSI 60 allows the modem 32 to control the clocking of data into and out of the communications controller 34. Table 1 below provides the details of the GPSI 60 signal lines:

TABLE 1

| Signal Name | Direction | Description |
|---|---|---|
| TENA | To Modem | Transmit Enable. Qualifies TX as containing packet data |
| TX | To Modem | Transmit data to encoder |
| TCLK | From Modem | Transmit Clock. Runs continuously when TXENA deasserted, stopped while Access ID, runs at variable rate under control of transmit encoder during transmission. |
| RENA | From Modem | Receive Enable. Qualifies RX as containing packet data. |
| RX | From Modem | Receive data from decoder. |
| RCLK | From Modem | Receive Clock. Runs continuously when the wire is idle, is stopped during reception of an Access ID, runs at variable rates under control of the decoder during packet · reception. |
| CLSN | From Modem | Collision Sense. Indicates either a transmit or receive mode collision. |

The management interface 62 is a simple 4-wire serial interface for setting and reading management configuration information. A microprocessor within the communications controller 34 uses this interface to establish the speed of operation, and to set the access sequencer's 48 mode of operation. In one embodiment the communications controller 34 is an ethernet controller, and the management parameters for the modem 32 are stored in a serial EEPROM, and loaded automatically every time the controller 34 is reset or initialized. Table 2 below details the relevant signal pins and management configuration data:

| Signal Name | Direction | Description |
|---|---|---|
| MDO | From Modem | Serial data stream readout of modem configuration parameters. |
| MDI | To Modem | Serial data stream settings of modem configuration parameters. |
| MCLK | To Modem | Serial data clock. Data is shifted in/out on the rising edge of this signal. |
| MCS | To Modem | Chip select. Qualifies and frams activity on the serial data channel. First data channel. First data bit is received/transmitted following assertion of this signal. Configuration data is loaded into internal registers upon transition to deasserted state. |

The receiver 50*b* further includes an Analog Front End (AFE) 50*c* and a Phase-lock loop (PLL) circuit 50*d*. The AFE 50*c* shapes transmit pulses, and finds and indicates to the receiver 50*b* the time (temporal) location of the incident peak of a received waveform (pulse).

Figure 4:
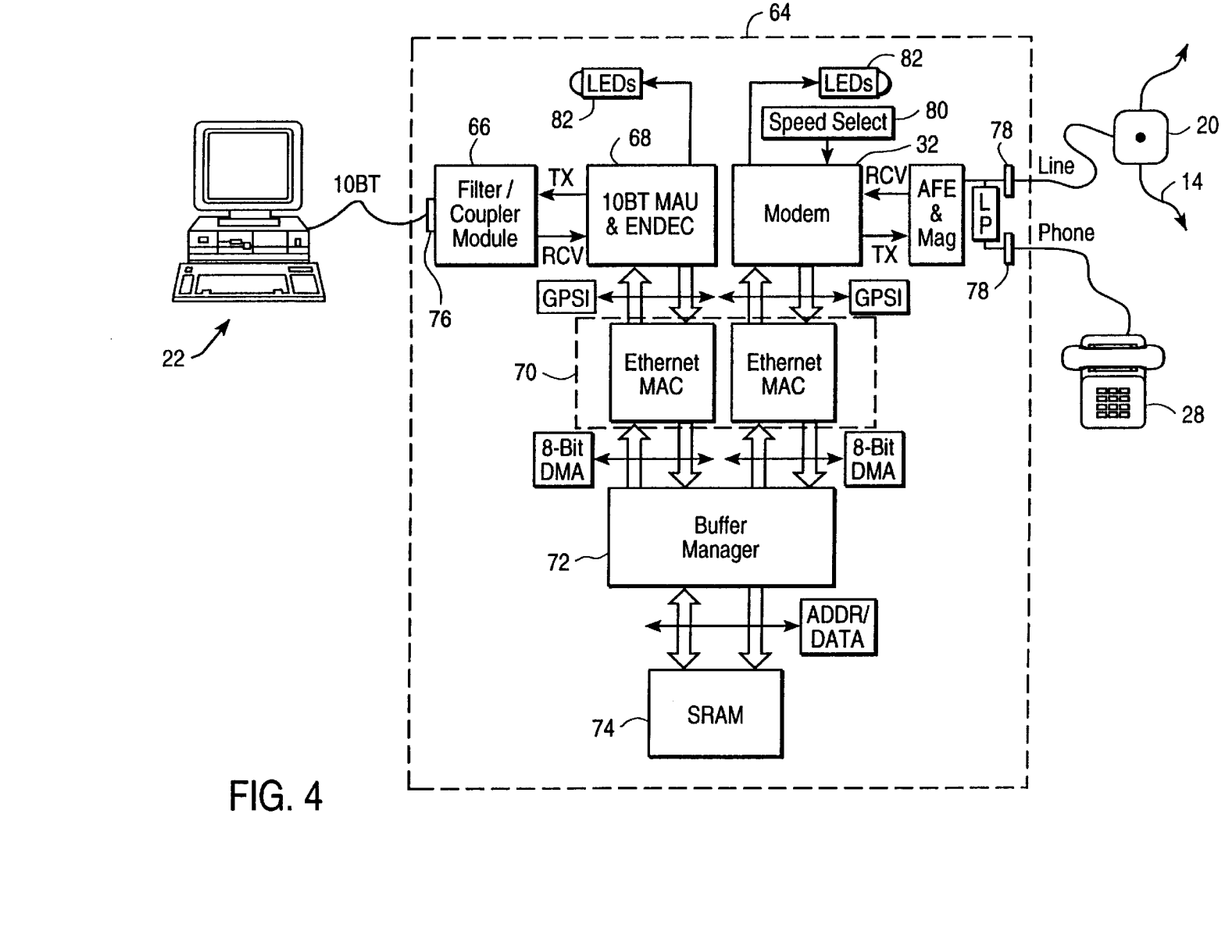
FIG. 4 is a diagrammatic representation of a 10baseT-to-POTS adapter, according to one embodiment of the present invention.

FIG. 4 illustrates the modem 32 included within an adapter 64, which allows a computer 22 including a 10BaseT Ethernet communications controller to communicate over a LAN implemented using POTS wiring 14. The adapter 64 includes a filter/coupler module 66, a 10BaseT Media Access Unit (MAU), an ENDEC 68, an Ethernet MAC Controller 70, a buffer manager 72, and a Static Random Access Memory (SRAM) 74. The adapter 64 acts as a non-filtering bridge, and receives packets from either interface, buffers such packets temporarily, and transmits them to the opposite interface as soon as possible. Specifically, the buffer manager 72 uses the SRAM 74 to emulate two large FIFO memories buffering packets being transferred between 10BaseT and the POTS wiring 14. In one embodiment, the adapter 64 does not have a MAC LAN address. The adapter 64 further includes a RJ-45 connector 76 for 10BaseT access, and two RJ-11 connectors 78. A speed selector 80 allows a user to configure the transmission speed of the adapter 64. The adapter 84 also includes an array of diagnostic Light Emitting Diodes (LEDs) 82.

Encoding

As a result of the arbitrary topology and the unterminated nature of the POTS wiring, the present invention proposes encoding predetermined bit sequences as respective symbols for transmission. In one embodiment, each symbol is distinguished by having a specific time duration, this time duration being determined by the time interval between the receipt of first and second delimiters, in the form of electrical pulses. The present invention proposes encoding data in the precise time arrivals of short duration pulses which are widely separated in time. As described above, a transmitted pulse is attenuated and scattered as it bounces around the wiring 14. After enough time has elapsed, the pulse will die out and another can be sent without fear of interference from the previous pulse. Specifically, once the reflections resulting from a particular pulse drop below a receiver's sensitivity threshold, another pulse can be sent without risking intersymbol interference. Reference is now made to FIG. 7 which shows the waveform 52 received at a receiver 50*b* in response to the transmission of a sinusoidal pulse from a transmitter 50*a*. As illustrated, in one embodiment of the present invention receiver's sensitivity threshold may decay exponentially after detection of a first peak 56.

For the purposes of this specification, it is convenient to specify a time unit in which the time between the transmission of pulses can be expressed. To this end, a time unit arbitrarily termed a TIC is defined as comprising 0.1167 microseconds.

Figure 5:
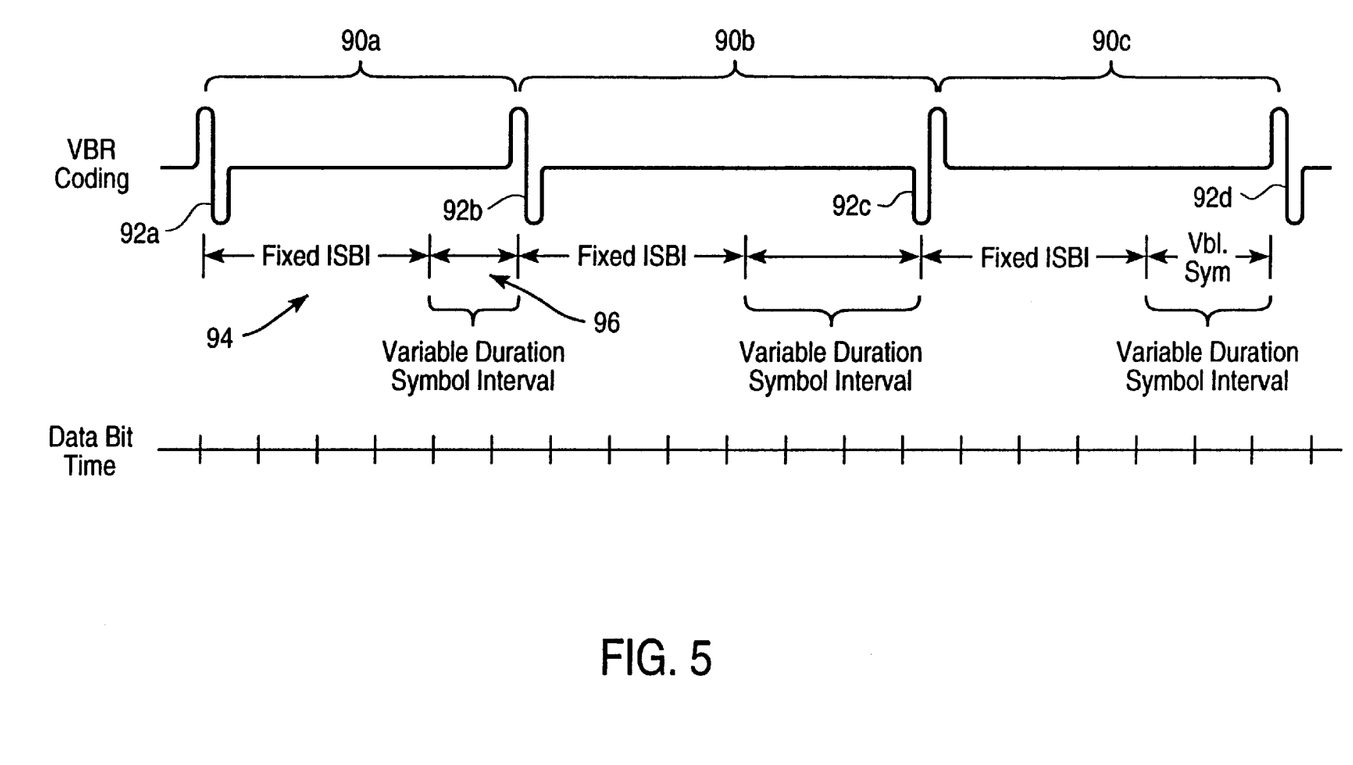
FIG. 5 illustrates a sequence of symbols, each encoding a bit sequence and constructed according to the teachings of the present invention.

Referring now specifically to FIG. 5, a series of sequential symbols 90a–90c are shown to be separated and distinguished by a series of pulses 92a–92c transmitted from a receiver 50b over the wiring 14. Each symbol 90 has a predetermined duration indicative of a respective bit sequence. A minimum time must separate each of the pulses 92 from a preceding pulse, so as to allow reflections resulting from the pulse 92 to decay below a receiver's threshold. This minimum time is included within each symbol 90 as a fixed-duration (or buffer) symbol portion, and may be conveniently referred to as an Inter-Symbol Blanking Interval (ISBI) 94. The duration of the ISBI 94 is determined by a number of factors, such as the complexity of the POTS wiring topology, the impedance of terminators (e.g., telephones) on the ends of each wiring branch, and random noise on the line which may add to the amplitude of decaying reflections. In one exemplary embodiment, the ISBI 94 has a duration of between 1 and 5 microseconds, and specifically of 2.1 microseconds (i.e., 20 TICs within a modem 32 operating at 60 MHz.) It will be appreciated that the ISBI 94 effects the transmission data rate, and it is desirable to have the ISBI 94 as short as possible.

Each symbol 90 is furthermore shown to comprise a variable-duration symbol (or encoding) portion 96 indicative of a predetermined bit sequence. The symbol portion 96 may be expressed as an integer multiple of the TIC time interval, and the duration of a symbol may thus be expressed as ISBI+D*TIC, where D is an integer.

Figure 6:
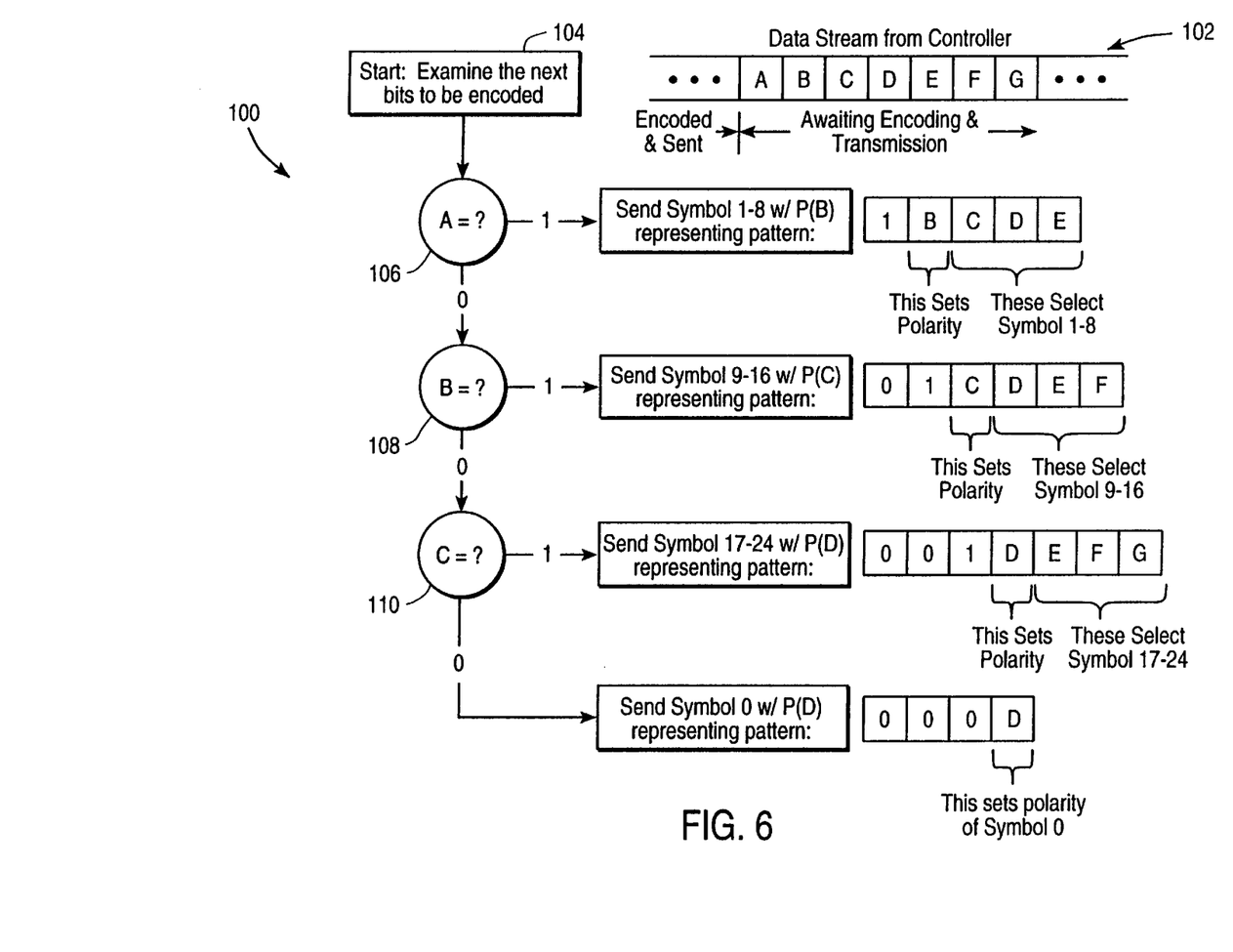
FIG. 6 is a coding tree illustrating a method, according to one embodiment of the present invention, of coding a bit sequence.

An exemplary method of encoding a bit stream as a sequence of symbols 90 will now be described with reference to FIG. 6. Specifically FIG. 6 shows a coding tree 100 illustrating a method of coding a bit stream. The encoding is performed by the ENDEC 46, which includes a shift register receiving a bit stream 102 from the communications controller 34 via the GPSI 60. For the purposes of explanation, the encoding of a specific bit sequence, comprising bits A–G of bit stream 102, will be explained. The encoding method begins at step 104 with an examination of the next bit to be encoded (i.e., bit A). At step 106 a determination is made as to whether bit A is a one (1). If so, the next bit (i.e., bit B) determines the polarity of a pulse which will comprise a delimiter of a symbol representing bits A–E. The next three bits (i.e., bits C–E) select one of a first set of eight symbols (Symbols 1–8). Each of the Symbols 1–8 includes the fixed ISBI 94, as well as the variable-duration symbol portion 96.

Alternatively, if it is determined at step 106 that bit A is a zero, the method proceeds to step 108, where a determination is made as to whether bit B is a one or a zero. If bit B is a one, then bit C determines the pulse polarity and the next three bits (i.e. bits D, E and F) select one of eight symbols in a second group (Symbols 9–16).

If both bit A and bit B are zeros, then the method proceeds to step 110, where a determination is made as to whether bit C is a one or a zero. If bit C is a one, then bit D determines the pulse polarity and the next three bits (i.e., bits E, F and G) select which of a third group of eight symbols (Symbols 17–24) is selected to encode the bit pattern. If bits A, B and C are all zeros, then bit D selects the polarity and a Symbol 0 is selected to represent the bit pattern.

Accordingly, it will be appreciated that Symbol 0 encodes a 4-bit sequence 000D, Symbols 1–8 encode a 5-bit sequence 1BCDE, Symbols 9–16 encode a 6-bit sequence 01CDEF and Symbols 17–24 encode a 7-bit sequence 001DEFG.

The encoding method thus encodes bit sequences in groups of varying sizes, specifically in groups either 4, 5, 6, or 7 bits. The symbols are assigned to the encoded bit sequences in a manner which causes more data bits to be encoded in symbols having a greater duration. For example, symbols 17–24 will include variable-duration portions 96 which are longer in duration than the variable-duration symbol portions of Symbols 1–8. This allows optimal average and minimum bit rates to be achieved. The encoding of a bit utilizing the polarity of a pulse which acts as a delimiter for the symbol also contributes towards optimization of the encoding methodology.

Figure 8A:
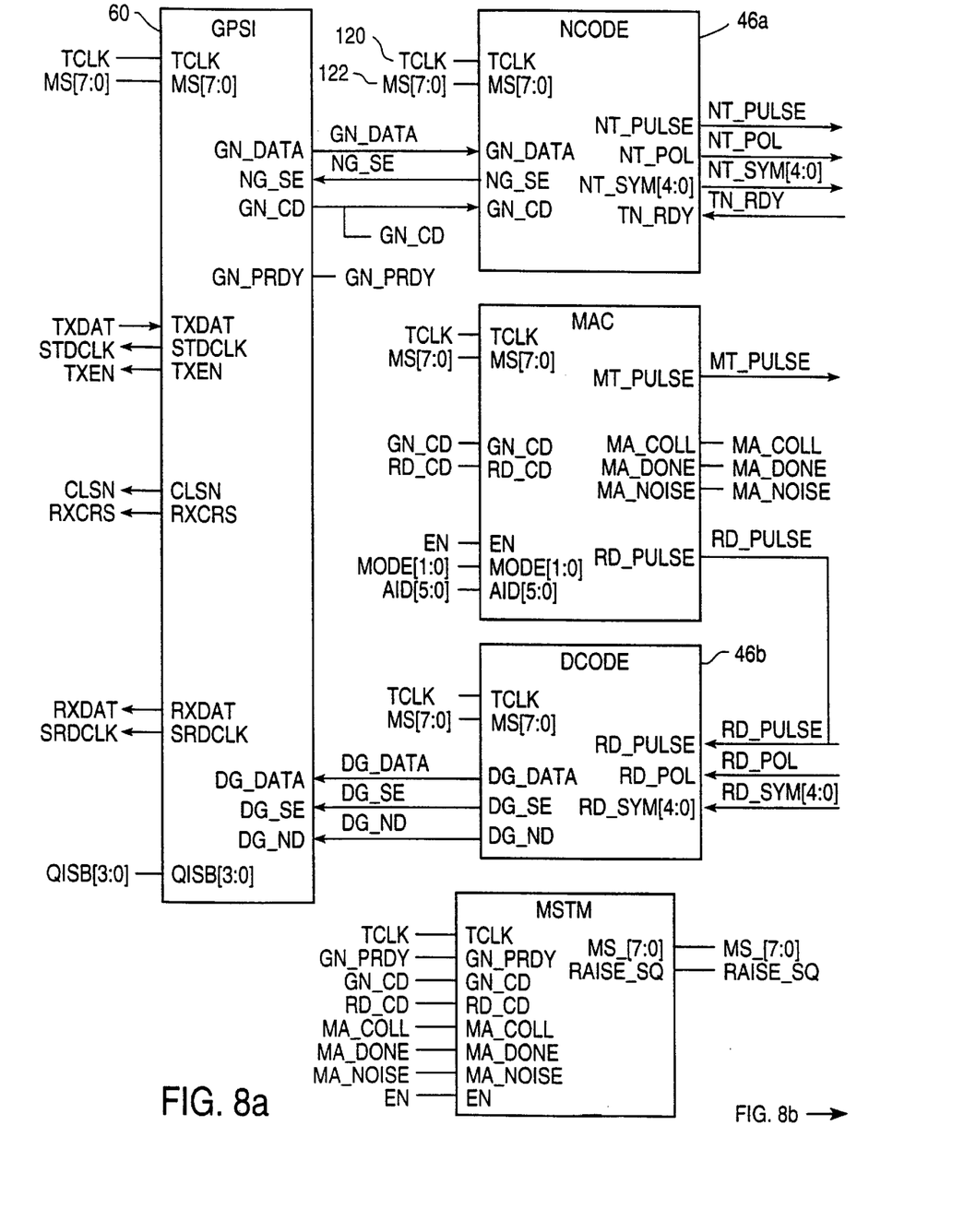
FIGS. 8a–8b is a schematic illustration of an exemplary embodiment of the modem shown in FIG. 3.
Figure 8B:
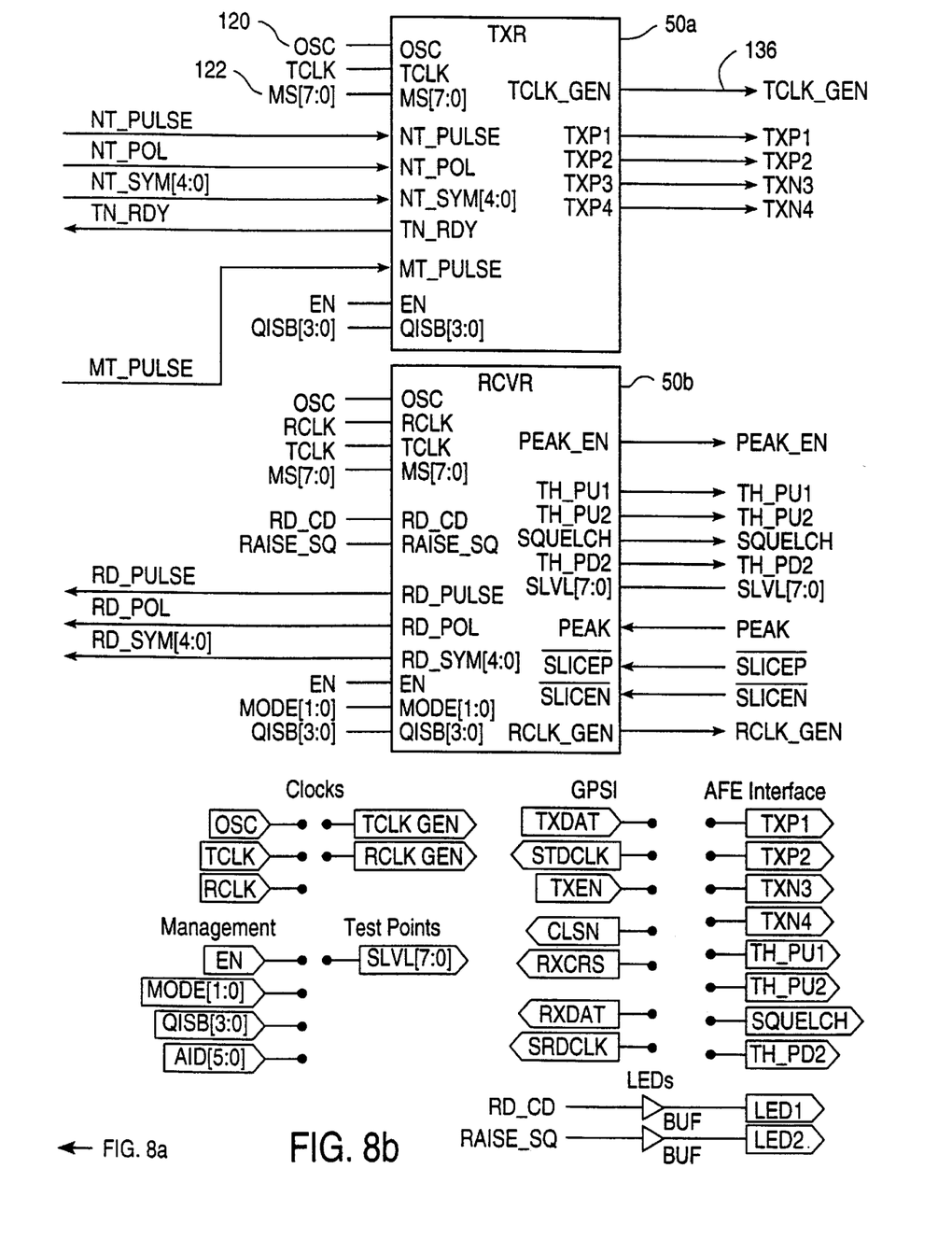
Figure 9A:
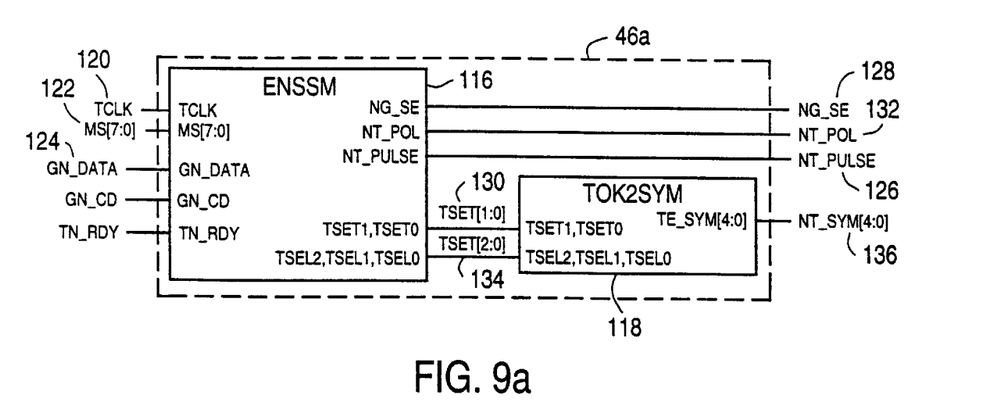
FIGS. 9a and 9b are schematic illustrations of an encoder and a decoder included within the modem shown in FIG. 8.

FIGS. 8 and 9a illustrate an exemplary embodiment of the modem 32 implemented using Field Programmable Gate Arrays (FPGAs). The encoder 46A is shown in FIG. 9a to comprise an encode state machine 116 and a token-to-symbol conversion circuit 118. The encode state machine receives a TIC clock (TCLK) signal 120, and a Master State (MS [7:0]) signal 122 which indicates the master state of the modem 32 and is generated by the access sequencer 48. The encode state machine 116 also receives data to be encoded via input (GN_DATA) 124 from the communications controller 34 via the GPSI 60. The outputs of the encode state machine 116 include the following signals:

1. NT_Pulse 126: Assertion of this signal instructs the transmitter to send a pulse and to accept a next symbol for transmission;

2. NG_SE signal 128: Assertion of this signal informs the GPSI 60 to shift out another bit;

3. NT_POL 132: This signal represents the data bit which follows the bits used to select the group of symbol from which the transmitted symbol is selected, and sets the polarity of the next symbol delimiter (or pulse);

4. TSET [1:0] signal 130: This signal encodes whether the next bits are 000, 01 or 001 (i.e., selects the set of eight symbols from which the symbol is selected); and 5. TSEL [2:0] signal 134: This signal comprises the three select bits following the polarity bit indicated by the NT_POL signal 132 and is used to select a symbol from within a group of eight symbols.

The token-to-symbol conversion circuit 118 receives the TSET [1:0] signal 130 and the TSEL [2:0] signal 134 from the state machine 116, and generates the symbol to be transmitted, represented by the NT_SYM [4:0] signal 136. The symbol (i.e. the NT_SYM [4:0] signal 136) is propagated to the transmitter 50a, as shown in FIG. 8, which adds to this symbol the ISBI portion 94 to thereby generate the composite symbol. The transmitter 50a waits for a number of TICs represented by this composite signal between the transmission of delimiter pulses.

Operation of the embodiment of the encoder 46a shown in FIGS. 8 and 9 will now briefly be described. Firstly, the NT_pulse signal 126 is asserted, causing a pulse to be transmitted from the transmitter 50a. The transmitter 50a further includes the interpulse timer 51 which begins a timed record from issuance of this pulse. Next, the shift register within the encoder state machine 116 is reset and the NG_SE signal 128 is asserted to receive a bit from the GPSI 60. The contents of the shift register are then shifted to the left and examined until one of four patterns is recognized (i.e., 000, 1, 01, 001). If one of these patterns is found, shifting stops and decoding logic within the encoder 46a encodes the bit patent as a number "0 . . . 3". The TSEL2 . . . TSEL0 and NT_POL signals are then outputted to indicate the symbol select and the polarity. External combinational logic in the encoder 46a (i.e., the conversion circuit 118) and the transmitter 50a convert this information into a number of TICs between pulses needed to encode the bit sequence. Specifically, the transmitter 50a receives pulse and polarity information synchronized to the TIC clock signal 122 and then generates a pulse doublet, which comprises a sinusoidal pulse of a fixed width and of a polarity determined by the NT_POL signal 132. The transmitter 50a transmits this pulse on the TXP and TXN outputs. The time at which to generate this delimiting pulse is determined in accordance with the symbol information sent to the transmitter 50a by the encoder 46a and in accordance with the interpulse timer 51.

Decoding

Figure 9B:
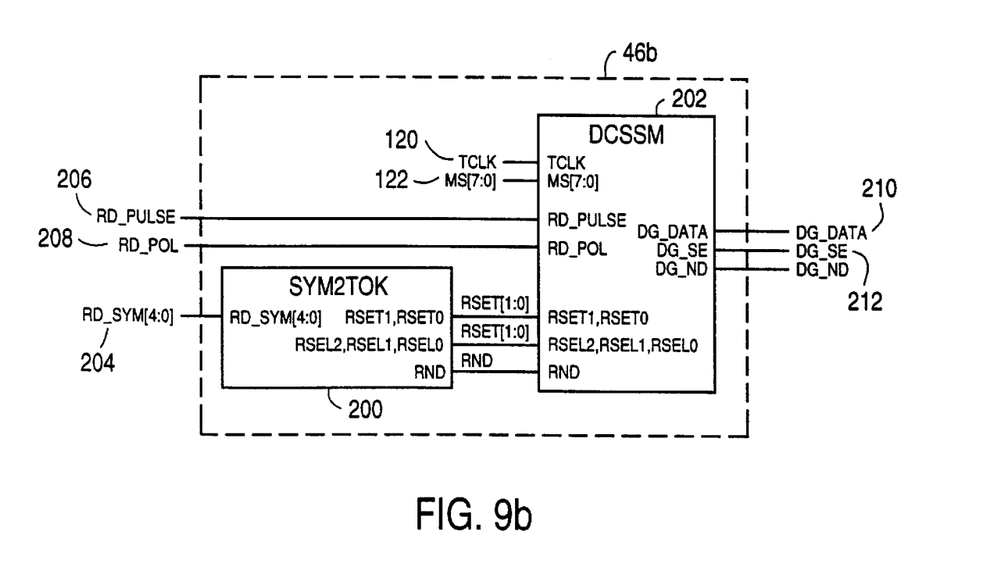

Referring again to FIG. 8 and to FIG. 9B, in response to the transmission of a sinusoidal pulse doublet from a transmitter 50a coupled the POTS wiring 14, a response waveform 150, such as that shown in FIG. 7, is received at a receiver 50b. In order to determine the time duration between transmitted pulses, the receiver 50b is required to determine the precise time of arrival of incident peaks, such as the incident peak 56 shown in FIG. 7. In one exemplary embodiment, the main receiver signal path consists of an amplifier followed by a differentiator (not shown). The amplifier may be necessary to compensate for the low transmit levels required for compliance with FCC Part 68, and gain is accordingly fixed at about 15 dB. The output of the amplifier is fed to a differentiator, whose output changes polarity whenever the input waveform's slope changes sign. The output of the differentiator is gated by both time and amplitude processing circuits within the receiver 50b. Following the detection of a peak, the interpulse timer 51 (which times the ISBI interval 94) is started. During this time the receiver 50b is disarmed. Peaks within the received waveform 150 are ignored during the ISBI interval 94, even if the amplitudes are greater than that of the originally detected peak.

The differentiator may be sensitive to noise and thus susceptible to producing spurious outputs during the ISBI period. In one exemplary embodiment, to further qualify the output of the differentiator, two comparators and a "peak following" threshold generating circuit (not shown) detect the polarity of an incoming pulse. The comparators take as inputs the amplified waveform and a threshold voltage. The comparators receive opposite phases of the amplified input waveform, so that one comparator's output is active when the waveform exceeds the threshold in a positive direction, and the other comparator's output is active when the waveform exceeds the threshold in a negative direction. The threshold voltage, generated by the threshold generating circuit, tracks the amplitude of the incident peak 56. Once the incident peak 56 passes, the threshold voltage may be allowed to decay exponentially, as shown in FIG. 7, in a manner that roughly models the expected lowered amplitude response of received reflection pulses. A bias ensures that the threshold voltage can only sink to a minimum value representing the maximum sensitivity of the receiver 50b. A synchronized digital state machine controls operation of the receiver 50b. The receiver 50b is again armed when the amplified waveform voltage is below the threshold, and the interpulse timer 51 has expired. As a new waveform 152 arrives, the amplified line voltage rises above, or falls below, the threshold voltage, causing one of the two comparators to again become active. This then sets a latch which remembers the polarity of the incident wave form, and disables the output of the other comparator until the receiver 50b is re-armed. The setting of this latch causes the threshold voltage to be driven to the peak voltage of the incident wave.

The latch also arms an edge detector circuit (not shown) which is looking for a transition from the peak detector, indicating the arrival of a first incident peak 56. The output of the edged detector is a one-cycle wide pulse synchronized to the system clock isolator. Detecting the peak starts the ISBI timer which, in turn, holds the comparator latch circuit reset and makes the receiver 50b blind to any more input pulses until the interpulse timer 51 expires.

While the receiver 50b is waiting of the next pulse, the threshold generating circuit output is in a high impedance state, allowing a capacitor to hold the threshold voltage. A bleed resistor causes this voltage to drain off, effectively increasing the sensitivity of the receiver 50b with the passing of time from the last pulse.

The decoder 46b performs the reverse of the operation performed by the encoder 46a. Specifically, the decoder 46b receives the encoding symbol portion 96 from the receiver 50b and reconstitutes a token (i.e., a set/select pair) from which the original bit sequence can be generated. Specifically, the decoder includes a symbol-to-token conversion circuit 200 and a decode state machine 202 as shown in FIG. 9B. The conversion circuit 200 receives the symbol via input RD_SYM[4:0] 204 from the receiver 50b, this symbol being derived from the measured inter-pulse time. Specifically, the receiver 50b identifies a composite symbol based on the time duration between succession delimiter pulses, and subtracts the known fixed-duration (or buffer portion) (ISBI) 94 from the composite symbol to reveal the encoding portion 96, which is represented by the signal on RD_SYM[4:0] input. The symbol is converted by the circuit 200 to the following token outputs:

1. RSET[1:0]: This output indicates the set of eight symbols to which the relevant symbol belongs; and 2. RSEL[2:0]: This output indicates which of the symbols in the selected set comprises the appropriate symbol.

The token values are then fed to the decoder state machine 202 which, based on the supplied token consisting of a set, select and polarity, determines the length and pattern of the decoded bit sequence. The inputs to the decoder state machine 202 include the following:

1. RD_PULSE 206: This signal indicates to the decode state machine 202 that a symbol pulse has been detected; and 2. RD_POL 208: This signal indicates the polarity bit of the pulse.

Outputs of the decode state machine 202 include the following:

1. DG_DATA 210: The decoded bit sequence is sent to the communications controller, via the GPSI 60, on this output; and 2. DG_SE 212: This output tells the GPSI 60 to shift in another bit.

While the above exemplary embodiment has been realized utilizing FPGAs, it will readily be appreciated that the circuitry and functional units described above may readily be incorporated within an Application Specific Integrated Circuit (ASIC).

Thus, a method and apparatus for decoding a bit sequence for transmission over a POTS wiring have been described. Although the present invention has been described with reference to specific exemplary embodiments, it will be evident that various modifications and changes may be made to these embodiments without departing from the broader scope and spirit of the invention. Accordingly, the specification and drawings are to be regarded in an illustrative rather than a restrictive sense.

What is claimed is:

1. A method of decoding a symbol having a time duration indicative of a bit sequence and determined by first and second delimiters, the method including the steps of:

detecting the first delimiter of the symbol on a carrier medium;

measuring a predetermined blanking interval following the detection of the first delimiter;

preventing detection of the second delimiter before expiration of the predetermined blanking interval to prevent the detection of reflections resulting from propagation of the first delimiter over the carrier medium;

detecting the second delimiter of the symbol on the carrier medium after the expiration of the predetermined blanking interval; and identifying the symbol indicative of the bit sequence from a group of symbols, based on a time duration between the respective detections of the first and second delimiters.

2. The method of claim 1 wherein the first and second delimiters comprise first and second electrical pulses respectively, the method including the step of decoding at least one bit of the bit sequence utilizing the polarity of either the first or the second pulse.

3. The method of claim 2 including the step of decoding the at least one bit of the bit sequence utilizing the polarity of the second pulse relative to the polarity of the first pulse, or vice versa.

4. The method of claim 1 including the step of defining a predetermined group of symbols of varying durations and associating each of the symbols with a respective and predetermined bit sequence, wherein the group of symbols includes symbols of equal duration that are distinguished from each other by the polarities of their respective delimiters.

5. The method of claim 1 wherein the step of preventing detection of the second delimiter comprises preventing detection of the second delimiter for a time period of between one and five microseconds.

6. The method of claim 5 wherein the step of preventing detection of the second delimiter comprises preventing detection of the second delimiter for a period of approximately 2.1 microseconds.

7. The method of claim 1 wherein the steps of detecting the first and second delimiters each include the step of detecting a peak of a pulse a signal propagated on the carrier medium.

8. The method of claim 7 wherein the step of detecting the peak of a pulse of a signal propagated on the carrier medium comprises performing a differentiation operation with respect to the signal propagated on the carrier medium.

9. The method of claim 1 wherein the steps of detecting the first and second delimiters each comprise detecting a respective delimiter propagated over Plain Old Telephone Service (POTS) wiring.

10. The method of claim 9 wherein the POTS wiring comprises unshielded, twisted-pair (UTP) telephone cable.

11. The method of claim 10 wherein the UTP telephone cable comprises either Category 1 or Category 2 cable.

12. A method of identifying a symbol having a time duration indicative of encoded data, the time duration of the symbol being defined by first and second delimiters, the method including:

detecting the first delimiter of the symbol on the carrier medium utilizing a receiver coupled to the carrier medium;

measuring a predetermined blanking interval following the detection of the first delimiter by initiating a timer on the detection of the first delimiter;

preventing detection of the second delimiter before expiration of the predetermined blanking interval by disarming in the receiver until expiration of the predetermined blanking interval;

detecting the second delimiter of the symbol on the carrier medium utilizing the receiver after the expiration of the predetermined blanking interval;

identifying a symbol from a group of symbols based on a time duration, measured utilizing the timer, between the detection of the first and second delimiters; and identifying encoded data corresponding to the identified symbol.

13. A decoder arrangement for decoding a symbol having a time duration indicative of a bit sequence and defined by first and second delimiters, the decoder arrangement comprising:

a receiver coupled to detect the first and second delimiters propagated over a carrier medium; and a blanking circuit to identify a blanking portion of the symbol on detection of the first delimiter, and to prevent detection of the second delimiter before expiration of the blanking portion to thereby prevent detection of reflections resulting from propagation of the first delimiter over the carrier medium; and a matching circuit to identify the symbol indicative of the bit sequence from a group of symbols, based on a time duration between the respective detections of the first and second delimiters.

14. The decoder arrangement of claim 13 wherein the first and second delimiters comprise first and second electrical pulses respectively, the decoder arrangement being adapted to decode at least one bit of the bit sequence utilizing the polarity of the second pulse, or vice versa.

15. The decoder arrangement of claim 14 wherein the at least one bit of the bit sequence is decoded utilizing the polarity of the second pulse relative to the polarity of the first pulse.

16. The decoder arrangement of claim 13 including a memory resource to store a predetermined group of symbols of varying durations, each of the symbols being associated with a respective and predetermined bit sequence, wherein the group of symbols includes symbols of equal duration that are distinguished from each other by the polarities of their respective delimiters.

17. The decoder arrangement of claim 13 wherein the blanking circuit prevents the detection of the second delimiter for a time period of between one and five microseconds.

18. The decoder arrangement of claim 17 wherein the blanking circuit prevents the detection of the second delimiter for a period of approximately 2.1 microseconds.

19. The decoder arrangement of claim 13 wherein the blanking circuit includes a differentiator to detect a peak of a pulse of a signal propagated on the carrier medium.

20. The decoder arrangement of claim 13 wherein the blanking circuit includes a timer to measure a predetermined blanking interval subsequent to the detection of the first delimiter, and a disarming circuit to disarm the receiver until expiration of the predetermined blanking interval.

21. The decoder arrangement of claim 13 wherein the receiver is configured to detect the first and second delimiters as respective pulses propagated over Plain Old Telephone Service (POTS) wiring.

22. The decoder arrangement of claim 21 wherein the POTS wiring comprises unshielded, twisted-pair (UTP) telephone cable.

23. The decoder arrangement of claim 22 wherein the UTP telephone cable comprises either Category 1 or Category 2 cable.

24. A decoder arrangement for identifying a symbol associated with predetermined data and defined by a time duration between first and second delimiters, the decoder arrangement comprising:

a receiver coupled to detect delimiters propagated on a carrier medium;

a blanking circuit to measure a predetermined blanking interval subsequent to detection of a first delimiter of a symbol, and to prevent detection of a second delimiter of the symbol for a duration of the predetermined blanking interval, so as to prevent detection of reflections, resulting from propagation of the first delimiter over the carrier medium, as the second delimiter; and a decoding circuit to identify predetermined data associated with the symbol as defined by the time duration between respective detections of the first and second delimiters by the receiver.

25. The decoder arrangement of claim 24 wherein the blanking circuit includes a disabling circuit to increase sensitivity of the receiver, relative to a predetermined level of sensitivity, over the duration of the predetermined blanking interval.

26. The decoder arrangement of claim 24 wherein the disabling circuit increases the sensitivity of the receiver from a first level of sensitivity to a second level of sensitivity during the predetermined blanking interval, both the first and second levels of sensitivity being less than the predetermined level of sensitivity.

27. The decode arrangement of 24 wherein the blanking circuit includes a timer to measure the predetermined blanking interval subsequent to the detection of the first delimiter of the symbol.

28. The decoder arrangement of claim 24 wherein the blanking circuit prevents detection of the second delimiter for a time period of between one and five microseconds.

29. The decoder arrangement of claim 28 wherein the blanking circuit prevents detection of the second delimiter for a period of approximately 2.1 microseconds.

30. The decoder arrangement of claim 24 wherein the blanking circuit includes a differentiator to detect a peak of a pulse of a signal propagated on the carrier medium.

31. The decoder arrangement of claim 24 wherein the receiver is coupled to detect the first and second delimiters as respective pulses propagated over Plain Old Telephone Service (POTS) wiring.

32. The decoder arrangement of claim 31 wherein the POTS wiring comprises unshielded, twisted-pair (UTP) telephone cable.

33. The decoder arrangement of claim 32 wherein the UTP telephone cable comprises either Category 1 or Category 2 cable.

34. The decoder arrangement of claim 24 comprising a network interface card.

35. The decoder arrangement of 24 comprising an adapter for use with a communications controller of a computer system, the decoder arrangement including an interface for coupling the decoder arrangement to the communications controller of the computer system.

36. A decoder arrangement for identifying a symbol associated with predetermined data and defined by a time duration between first and second delimiters, the decoder arrangement comprising:

receiver means for detecting delimiters propagated on a carrier medium;

blanking means for measuring a predetermined blanking interval subsequent to detection of a first delimiter of a symbol, and for preventing detection of a second delimiter of the symbol for a duration of the predetermined blanking interval, so as to prevent detection of reflections, resulting from propagation of the first delimiter over the carrier medium, as the second delimiter; and decoding means for identifying predetermined data associated with the symbol as defined by the time duration between respective detections of the first and second delimiters by the receiver.

37. A network device comprising:

a processor to process data;

a receiver to detect delimiters propagated on a carrier medium;

a blanking circuit to measure a predetermined blanking interval subsequent to detection of a first delimiter of a symbol, and for preventing detection of a second delimiter of the symbol for a duration of the predetermined blanking interval, so as to prevent detection of reflections, resulting from propagation of the first delimiter over the carrier medium, as the second delimiter; and a decoder to identify predetermined data associated with the symbol as defined by the time duration between respective detections of the first and second delimiters by the receiver.

38. The network device of claim 37 comprising a computer system.

\* \* \* \* \*